United States Patent
Yeagle

[11] 3,877,253
[45] Apr. 15, 1975

[54] SLIP CLUTCH ASSEMBLY FOR TORQUE LIMITING DRIVE FOR HUMIDIFIER ROTORS AND THE LIKE

[75] Inventor: Richard J. Yeagle, Hartland, Mich.

[73] Assignee: Skuttle Manufacturing Company, Milford, Mich.

[22] Filed: Dec. 1, 1972

[21] Appl. No.: 311,415

[52] U.S. Cl. .................. 64/29; 24/30 E; 192/56
[51] Int. Cl. .................................... F16d 3/38
[58] Field of Search ............ 64/29, 30 E; 192/56; 64/30 R

[56] References Cited
UNITED STATES PATENTS
2,668,426  2/1954  Hoover .................................. 64/29
2,860,498  11/1958  Crossley ................................ 64/29
FOREIGN PATENTS OR APPLICATIONS
894,306  4/1962  United Kingdom ..................... 64/29

Primary Examiner—Samuel Scott
Assistant Examiner—Randall Heald
Attorney, Agent, or Firm—Strauch, Nolan, Neale, Nies & Kurz

[57] ABSTRACT

A rotary drum humidifier has the rotor shaft connected to an electric motor by a corrosion resistant slip clutch assembly consisting of a telscoped relatively rotatable plastic clutch members interconnected in torque transmitting relation by ball elements seated in sockets on the inner member and projecting into the outer member where they are retained by a rubber annulus in a groove in the outer member, and when the torque exceeds a predetermined amount the balls are forced out of the sockets to interrupt torque transmission until the excess torque condition no longer prevails.

4 Claims, 11 Drawing Figures

PATENTED APR 15 1975   3,877,253
FIG. 1
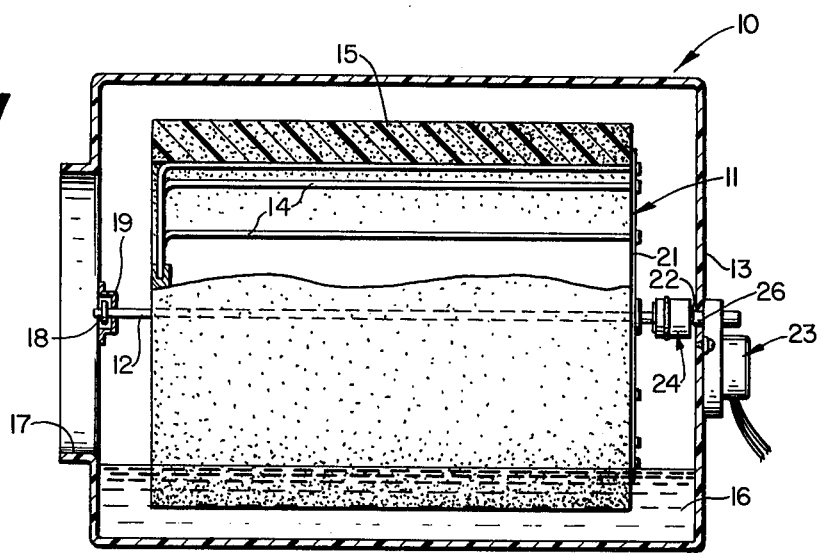
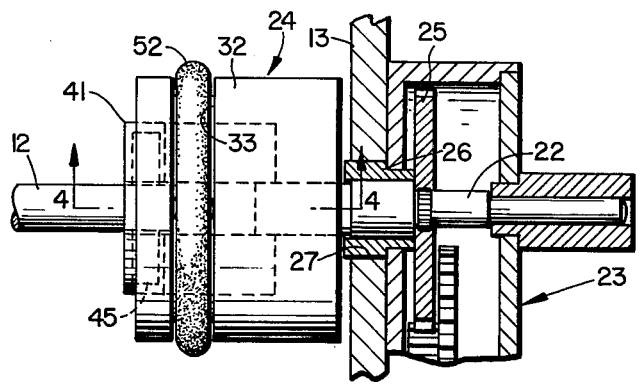
FIG. 2
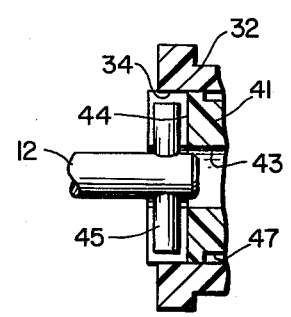
FIG. 3
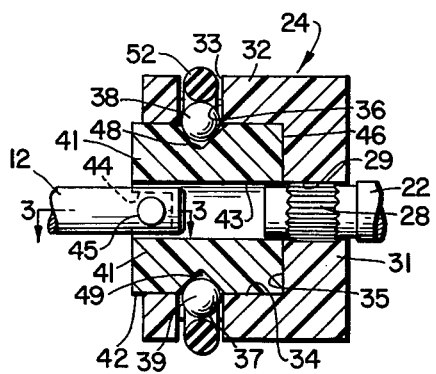
FIG. 4
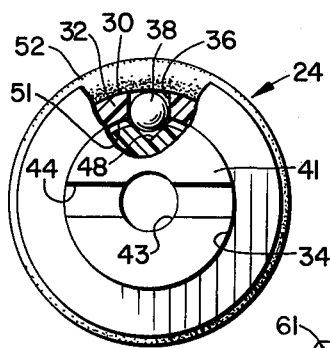
FIG. 5
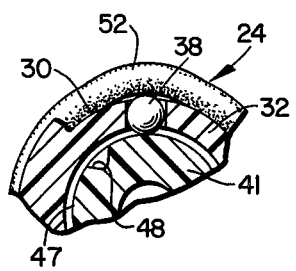
FIG. 6
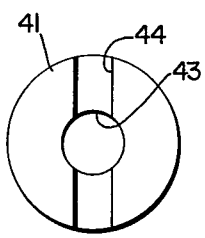
FIG. 8
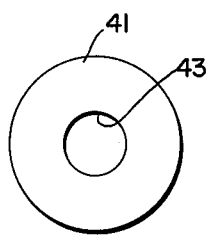
FIG. 9
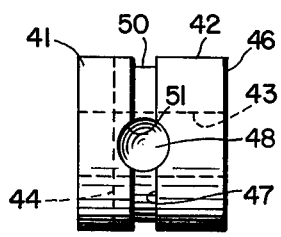
FIG. 7
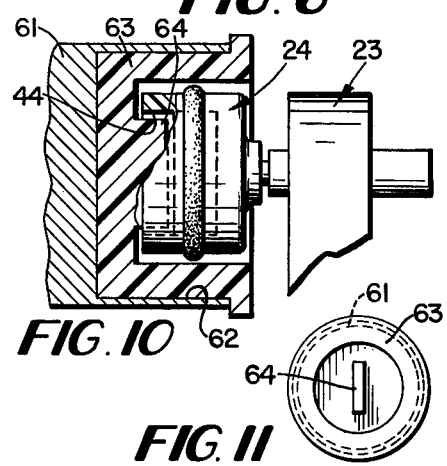
FIG. 10
FIG. 11

SLIP CLUTCH ASSEMBLY FOR TORQUE LIMITING DRIVE FOR HUMIDIFIER ROTORS AND THE LIKE

BACKGROUND AND SUMMARY OF INVENTION

This invention relates to torque limiting drive mechanism for rotary-type humidifiers and the like and it is particularly concerned with such mechanism wherein the drive connection to the rotor includes a slip clutch assembly that automatically protects it from injury due to excessive torque while excess torque conditions prevail. Rotary humidifiers are known wherein the slowly turning rotor carries a removable sleeve of open pore material such as foamed polyurethane that picks up water from a reservoir during part of its revolution and permits evaporation of that water into a hot airstream during the remainder of the revolution. The invention in its preferred embodiment is directed to an improvement in torque limiting drives for such rotary humidifier rotors.

The rotor is driven by a low-power electric motor through a considerable drive reduction gear train to obtain very slow speeds of rotation of the rotor. It has been found that under some operational conditions, such as where the rotor becomes difficult to start turning due to crusted or accumulated deposits or when the sleeve is being removed from or replaced on the rotor in the assembly, the drive gearing may be accidentally stripped because of unintentionally applied excess torque. Also where some of the gearing is exposed within the humidifier casing it may be subject to rust or corrosion.

The invention prevents such injury to the drive gearing in such rotary humidifiers by providing a novel slip clutch assembly between the motor output shaft and a shaft on which the rotor in mounted, the clutch having the capacity of transmitting normal starting and driving torques but being adapted to slip to interrupt power transmission when the torque exerted either by the motor trying to rotate the rotor, or by a person changing the rotor sleeve, becomes in excess of that for which the reduction gears are designed, and it is the major object of this invention to provide the foregoing.

The invention contemplates more specifically a novel arrangement wherein the rotor shaft is directly coupled to the output shaft of the motor by a resiliently biased ball and socket arrangement provided in a novel clutch assembly, all clutch parts being preferably composed of material that does not corrode due to exposure to hot water or chemical solutions normally encountered in humidifiers. These and other specific features as will appear are further objects of the invention.

Solutions to the problem solved by applicant have been heretofore proposed, as disclosed in U.S. Letters Pat. to Stiles Nos. 3,408,880 and 3,640,515 that disclose various slip clutch arrangements in the rotor drive. The present invention represents an improvement over such earlier arrangements, particularly in certain environments where corrosion protection is more important. It might also be noted that torque limiting resiliently biased ball and socket clutches of general application have been proposed as disclosed in U.S. Letters Pat. to Ferenci No. 1,805,652; Hoover No. 2,668,426 and Crossley No. 2,860,498 but the invention claimed herein is not disclosed in or obvious from the state of the art represented by the foregoing patents.

BRIEF DESCRIPTION OF DRAWINGS

FIG. 1 is a side elevation partly in section showing a rotary drum humidifier assembly incorporating the invention according to a preferred embodiment;

FIG. 2 is an enlarged fragmentary view partly broken away and sectioned showing torque limiting clutch structure;

FIG. 3 is an enlarged fragmentary view partly in section showing a connection between the rotor shaft and a clutch member;

FIG. 4 is an enlarged fragmentary view mainly in section showing clutch structure and connection of a clutch member to the motor assembly output shaft;

FIG. 5 is an end view partly broken away and in section showing clutch structure in clutch engaged condition;

FIG. 6 is an enlarged fragmentary section showing relationship of clutch parts in clutch disengaged condition;

FIGS. 7, 8 and 9 are respectively end, side and opposite end views of the inner clutch member;

FIG. 10 is a fragmentary view partly broken away and in section showing the invention in a further environment; and FIG. 11 is an end view of the roller socket receiving the clutch unit in FIG. 10.

PREFERRED EMBODIMENTS

FIG. 1 illustrates a humidifier assembly 10 wherein a rotary water pickup rotor assembly 11 is fixed on a horizontal drive shaft 12 rotatably mounted within a housing 13. The drum comprises a skeleton frame 14 carrying on its periphery an endwise removable annulus 15 of open pore polyurethane or equivalent, the lower section of which continuously moves through a body of water suitably maintained at a constant level within a reservoir 16 in the bottom of the housing. Housing 13 has an air inlet 17 and an air outlet at one side (not shown).

As shown one end of shaft 12 is suitably removably mounted in a bearing 18 carried by a fixed housing element 19 extending across to inlet to offer minimum resistance to air passage. The end of the rotor assembly adjacent the bearing 18 is open, and the opposite end is closed by a plate 21 secured to the frame. Thus air to be moistened entering inlet 17 will be deflected to pass through the annulus 15 before discharging through the housing side outlet.

Beyond plate 21 the end of shaft 12 is connected to the output shaft 22 of an electric motor and reduction drive gear unit 23 by a torque limiting clutch assembly 24.

As shown in FIG. 2 the electric motor driven gear train includes a final gear 25 fixed on output shaft 22 which projects rotatably through a collar or bushing 26 adapted to project through an aperture 27 in the housing wall, the motor casing being fixed as by screws onto the housing wall exteriorly of the rotor chamber.

The end of output shaft 22 is formed with a knurled section 28 forcibly introduced into a central aperture 29 in the end wall 31 of a generally cup-shaped outer clutch member 32. Since shaft 22 is usually of metal, and clutch member 32 is usually an integral lightweight hard smooth surfaced molded synthetic plastic member of polyethylene or the like, this effectively mounts the clutch member 32 on shaft 22 and non-rotatably interconnects shaft 22 and clutch member 32.

Outer clutch member 32 is preferably cylindrical with an annular external flat sided groove 33 formed thereon. Internally member 32 is formed with a cylindrical bore 34 open at one end and intersecting at its other end a flat inner surface 35 perpendicular to the clutch axis.

The depth of groove 33 may advantageously be about half the side wall thickness of member 32, and the bottom surface 30 of groove 33 except for openings 36 and 37 to be described is smooth and cylindrical.

Two diametrically spaced openings 36 and 37 are formed in the side wall of member 32 at the bottom of groove 33. These openings are preferably cylindrical bores having a diameter at least equal to the width of groove 33. For a purpose to appear these openings 36 and 37 freely rotatably receive motion transmitting elements in the form of spherical ball elements 38 and 39 respectively. The diameters of openings 36 and 37 are preferably slightly larger than the ball diameters.

Inner clutch member 41 is mounted on the outer clutch member and is also a lightweight hard smooth surfaced molded plastic member of polyethylene or the like, having an external cylindrical surface 42 and a central cylindrical through bore 43. The diameter of bore 43 is greater than the diameters of the adjacent end of shaft 12 and shaft 22 and such that (FIG. 4) it freely slidably receives the end of shaft 12. At the end adjacent shaft 12, coupling member 41 is formed with a diametrically extending groove 44 that (FIG. 3) receives a diametral tang 45 on the end of shaft 12 to non-rotatably drive connect clutch member 41 to rotor shaft 12.

The diameter of surface 42 is such that the inner clutch member has a smooth slidable rotatable telescopic fit in bore 34 of outer clutch member 32, and the end of member 41 opposite groove 44 is a flat radial surface 46 that slidably rotatably abuts surface 35. Inner coupling member 41 is formed with an external annular flat sided surface groove 47 which in the assembly is located in radial alignment with outer member groove 33. Groove 47 is preferably only about half the width of groove 33, and groove 47 has a constant diameter symmetrical cylindrical bottom surface 50.

Two diametrically opposite sockets 48 and 49 are formed in the inner clutch member. As shown in FIGS. 5 and 7 these sockets extend from the outer cylindrical surface 42 through the bottom of the groove 47, and are generally conical or spherical in contour. As shown in FIG. 7 the diameter of socket mouth 51 at surface 42 is greater than the width of groove 47 and such as to receive and seat the bottom of ball 38, but the depth of the socket is such that the ball seated therein also remains projecting upward within the associated outer clutch member opening 36 but not above the bottom surface 30 of groove 33. Ball 39 and socket 49 are similarly associated.

Balls 38 and 39 are, in the engaged condition of the clutch, resiliently retained seated in sockets 48 and 49 respectively by a resilient annulus 52 in groove 33. Thus elements 38 and 39 provide a torque transmitting connection between the clutch members. Annulus 52 is preferably a synthetic rubber or like synthetic plastics O-ring 53 having in unstressed condition a cross sectional diameter that is less than the width of groove 33 and an inner peripheral diameter that is substantially equal to or only slightly greater than the diameter of bottom groove surface 30. This annulus 52 may be resiliently passed over the end of the outer clutch member to relax into groove 33 where it engages and normally prevents radial outward displacement of ball elements 38 and 39 from the respective sockets. This condition shown in FIGS. 4 and 5 is the normal drive condition in the assembly wherein balls 38 and 39 are the sole motion transmitting connections between the clutch members.

However, should the torque being transmitted by the clutch assembly exceed a predetermined value, the wedging action at the sockets will force the ball elements 38 and 39 out of the sockets and above the level of groove surface 30 against the holding force of the resilient annulus which is locally resiliently deformed as shown in FIG. 6, and the inner and outer clutch member will relatively rotate with the balls riding on or outwardly of inner groove surface 50 and not transmitting torque.

Should the turning effort be maintained at excess torque the clutch members will continue to relatively rotate with the balls dropping into and being forced out of the sockets during each half revolution. However, when the torque reduces below the amount determined by the holding effort of the resilient annulus the balls will once again drop into a socket and the clutch assembly reassumes the FIGS. 4 and 5 drive condition.

The operation above described takes place regardless of the direction of relative rotation of the socket members.

While one ball and socket arrangement may accomplish the invention, it is preferred to provide at least two as shown in the drawings, or more if necessary for certain operations.

When the above clutch arrangement is used in a rotary drum humidifier or any other apparatus where it is constantly exposed to water vapors or liquids, the non-metallic plastic clutch parts (members 32 and 41 and O-ring 53) remain inert and uncorroded. It may be desirable to plate the shaft 12 to increase its resistance to corrosion, and balls 38 and 39 are usually ball bearing type balls of special corrosion resistant steel.

While the invention has been disclosed in its preferred embodiment, in a humidifier drum drive, it is capable of broader application.

FIGS. 10 and 11 illustrate a further embodiment wherein the slip clutch assembly 24 of the invention is incorporated in the drive between a motor 23 and the drive roller 61 of a humidifier of the endless belt type disclosed and claimed in my copending application Ser. No. 290,808 filed Sept. 21, 1972 for Humidifier Assembly.

Roller 61 is formed at one end with a recess 62 wherein is fixed a cup shaped socket member 63 that is preferably a molded plastic element having at its bottom wall a narrow tang 64 that fits into the diametric groove 44 of clutch assembly 24, to provide a separable torque limiting connection between the motor and drive roller 61.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A slip clutch assembly comprising inner and outer clutch members adapted to be connected between drive and driven devices, each of said clutch members being an integral synthetic plastics unit, the outer of said clutch members having a cylindrical bore, the inner of said clutch members having an external cylindrical surface smoothly slidably telescoped within said bore for rotatably mounting said inner clutch member directly within said outer clutch member, an external annular groove on said outer clutch member, a plurality of angularly spaced outwardly open sockets on the external surface of said inner clutch member, a motion transmitting connection between said clutch members comprising radially movable balls seated in said sockets and extending within corresponding openings in the bottom of said groove during normal drive conditions, and a resilient annulus consisting of an integral ring of synthetic plastics material in said groove for retaining said balls against displacement from said sockets under normal drive conditions but permitting said balls to be displaced out of said sockets to interrupt the motion transmitting connection between and permit relative rotation of said clutch members under torque conditions in excess of a predetermined amount.

2. The slip clutch assembly defined in claim 1, wherein there are two of said balls retained in respective sockets by said resilient annulus, and the said respective openings and sockets are diametrically spaced around said clutch members.

3. The slip clutch assembly defined in claim 1, wherein said inner clutch member is formed with an external annular groove in which said sockets are formed.

4. The slip clutch assembly defined in claim 1, wherein said outer clutch member is cup-shaped with a closed end secured to one of said devices and the internal surface of the closed end of said outer clutch member and the inner end surface of said inner clutch member are slidably rotatably engagable in a plane normal to the clutch axis, and said inner clutch member is formed at its outer end with axially open means for axially slidably non-rotatably receiving the other device.

* * * * *